US010792842B2

(12) United States Patent
Matsen et al.

(10) Patent No.: US 10,792,842 B2
(45) Date of Patent: Oct. 6, 2020

(54) INDUCTION MOLDING FOR PARTS HAVING THERMOPLASTIC PORTIONS

(71) Applicant: The Boeing Company, Chicago, IL (US)

(72) Inventors: Marc R. Matsen, Seattle, WA (US); William C. Dykstra, Rockford, MI (US); Lee Charles Firth, Renton, WA (US); Landon K. Henson, Snoqualmie, WA (US); Tunde A. Olaniyan, Bothell, WA (US); John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 15/791,683

(22) Filed: Oct. 24, 2017

(65) Prior Publication Data
US 2019/0118415 A1 Apr. 25, 2019

(51) Int. Cl.
B29C 33/06 (2006.01)
B29C 43/52 (2006.01)
(Continued)

(52) U.S. Cl.
CPC .............. B29C 33/06 (2013.01); B29C 43/36 (2013.01); B29C 43/52 (2013.01); B29C 70/46 (2013.01);
(Continued)

(58) Field of Classification Search
CPC ......... B29C 33/06; B29C 43/36; B29C 43/52; H05B 6/00; H05B 6/02; H05B 2206/00;
(Continued)

(56) References Cited

U.S. PATENT DOCUMENTS 5,647,426 A * 7/1997 Prieto ................... B22C 9/28
164/122.1
6,566,635 B1 5/2003 Matsen et al.
(Continued)

FOREIGN PATENT DOCUMENTS

EP 2596937 B1 5/2013

OTHER PUBLICATIONS

European Search Report; Application EP18198804; Jul. 19, 2019.
(Continued)

Primary Examiner — Alison L Hindenlang
Assistant Examiner — Shibin Liang
(74) Attorney, Agent, or Firm — Duft & Bornsen, PC

(57) ABSTRACT

Systems and methods are provided for molding systems that have a low thermal mass. One embodiment is a first tool that includes a first frame. The first frame includes a first set of plates of magnetically permeable material, and a material disposed between plates of the first set. The first tool also includes a first set of induction coils that are disposed within the first frame and that generate a first electromagnetic field, and a first susceptor that extends from the first set of plates. The first susceptor generates heat in response to the first electromagnetic field. The first tool further includes a mold that extends from the first susceptor and receives heat via conductive heat transfer from the first susceptor. Each plate of the first set is thinner than a skin depth at which the first electromagnetic field would generate an electrical induction current.

41 Claims, 15 Drawing Sheets

(51) Int. Cl.
*B29C 43/36* (2006.01)
*B29C 70/46* (2006.01)
*H05B 6/10* (2006.01)

(52) U.S. Cl.
CPC ....... *H05B 6/105* (2013.01); *H05B 2206/023* (2013.01)

(58) Field of Classification Search
CPC ...... B65D 258/3494; B65D 2581/3497; B65D 2581/3498; F27M 2001/026
See application file for complete search history.

(56) References Cited

U.S. PATENT DOCUMENTS

| | | | |
|---|---|---|---|
| 7,049,563 B2 * | 5/2006 | Keishima | H05B 6/1209 219/620 |
| 7,102,112 B2 | 9/2006 | Anderson et al. | |
| 8,017,059 B2 | 9/2011 | Matsen et al. | |
| 8,383,998 B1 * | 2/2013 | Matsen | H05B 6/105 219/618 |
| 8,770,968 B2 * | 7/2014 | Mourou | H05B 6/105 425/547 |
| 2009/0071217 A1 | 3/2009 | Matsen et al. | |
| 2015/0151471 A1 | 6/2015 | Feigenblum et al. | |
| 2017/0113421 A1 | 4/2017 | Tsotsis | |
| 2019/0001581 A1 * | 1/2019 | Hafenrichter | B29C 35/0805 |

OTHER PUBLICATIONS

Final Technical Report; Induction Consolidation/Molding of Thermoplastic Composites using Smart Susceptors; Program Manager—Mark Negley; Jun. 14, 2012.
Permeability (electromagnetism); Wikipedia; Aug. 22, 2017, online at https://en.wikipedia.org/wiki/Permeability_(electromagnetism).
Susceptor; Wikipedia; Aug. 22, 2017, online at https://en.wikipedia.org/wiki/Susceptor.
European Search Report; Application 18198804.9-1204; Apr. 3, 2019.

* cited by examiner

INDUCTION MOLDING FOR PARTS HAVING THERMOPLASTIC PORTIONS

FIELD

The disclosure relates to the field of fabrication via molding, and in particular, to molding parts via the use of heated tools.

BACKGROUND

Composite parts may be fabricated via molding, which involves heating a thermoplastic portion of the part, and pressing the thermoplastic portion of the part into a desired shape. However, it remains a complicated process to ensure that molding is performed consistently at a constant temperature, and without the generation of waste heat. If molding tools have too great of a thermal mass, then the process of molding may consume prohibitive amounts of energy, and the cycle time for fabricating the composite part may be increased, owing to an increased amount of time needed for cooling the mold. Similarly, generation of waste heat in an operating environment is undesirable, as waste heat increases the temperature of the surrounding environment without facilitating molding of parts.

Therefore, it would be desirable to have a method and apparatus that take into account at least some of the issues discussed above, as well as other possible issues.

SUMMARY

Embodiments described herein provide for induction molding of thermoplastic parts, and utilize "smart" susceptors that transition from magnetic to non-magnetic states when they are close to an induction molding temperature. This ensures that any thermoplastic contacting the smart susceptors will not exceed the induction molding temperature/processing temperature. The apparatus described herein also includes structural components that are thin enough to prevent them from being inductively heated by induction coils within the apparatus. This ensures that inductive heating is applied to the susceptors, and not to the structural components of the apparatus.

One embodiment is an apparatus that includes a first tool. The first tool includes a first frame. The first frame includes a first set of plates of magnetically permeable material that are parallel with each other and face each other, and a material disposed between plates of the first set that prevents electrical conduction between plates. The first tool also includes a first set of induction coils that are disposed within slots in the first frame and that generate a first electromagnetic field, and a first susceptor that extends from the first set of plates of the first frame. The first susceptor is made of a ferromagnetic material that generates heat in response to the first electromagnetic field, and that has a Curie point within ten degrees Celsius of a processing temperature for a thermoplastic portion of a part. The first tool further includes a mold that extends from the first susceptor and receives heat via conductive heat transfer from the first susceptor. Each plate of the first set is thinner than a skin depth at which the first electromagnetic field would generate an electrical induction current.

A further embodiment is a method. The method includes applying an electromagnetic field to a susceptor of ferromagnetic material that contacts tooling plugs at the mold, generating heat at the susceptors in response to the electromagnetic field, the susceptors having a Curie point corresponding with a processing temperature for the thermoplastic portion, and increasing a temperature of the thermoplastic portion to the processing temperature in response to conductive heat transfer from the susceptors to the thermoplastic portion via the mold. The method also includes driving the mold into the thermoplastic portion to shape the thermoplastic portion, and cooling the mold via tubes that apply cooling fluid to the tooling plugs.

A further embodiment is an apparatus that includes a mold. The mold includes an inner wall made from a magnetically permeable material, an outer wall made from a magnetically permeable material, and a cavity disposed between the inner wall and the outer wall. The apparatus further includes a susceptor, disposed within the cavity, made from a ferromagnetic material that generates heat in response to an electromagnetic field, and a support that is coupled to the mold, and that is made from a magnetically permeable material.

A further embodiment is a method. The method includes controlling heated molding of a thermoplastic while limiting waste heat. This is performed by inductively heating at least one susceptor that contacts a mold, while preventing inductive heating of structural components that support the mold, molding the thermoplastic by driving the mold into the thermoplastic, and cooling the mold by applying a cooling fluid directly to one or more internal chambers of the mold.

A further embodiment is a method for manufacturing a component by heating material which forms the component to a predetermined temperature. The method includes placing a material, that will be heated and manufactured into the component, in a receptacle made from a ferromagnetic material that generates inductive current in response to an electromagnetic flux field, the receptacle being capable of generating heat to a first predetermined temperature when subjected to the electromagnetic flux field. The method also includes placing a mold, made from a ferromagnetic material that generates inductive current in response to the electromagnetic flux field, in the receptacle, the mold including a plurality of removable smart susceptor inserts, each smart susceptor insert being made from a ferromagnetic material that generates inductive current in response to the electromagnetic flux field to generate heat to a second predetermined temperature, the plurality of smart susceptor inserts and the mold cooperating to achieve a composite predetermined temperature when subjected to the electromagnetic flux field. The method further includes generating the electromagnetic flux field in proximity to the receptacle and the mold.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
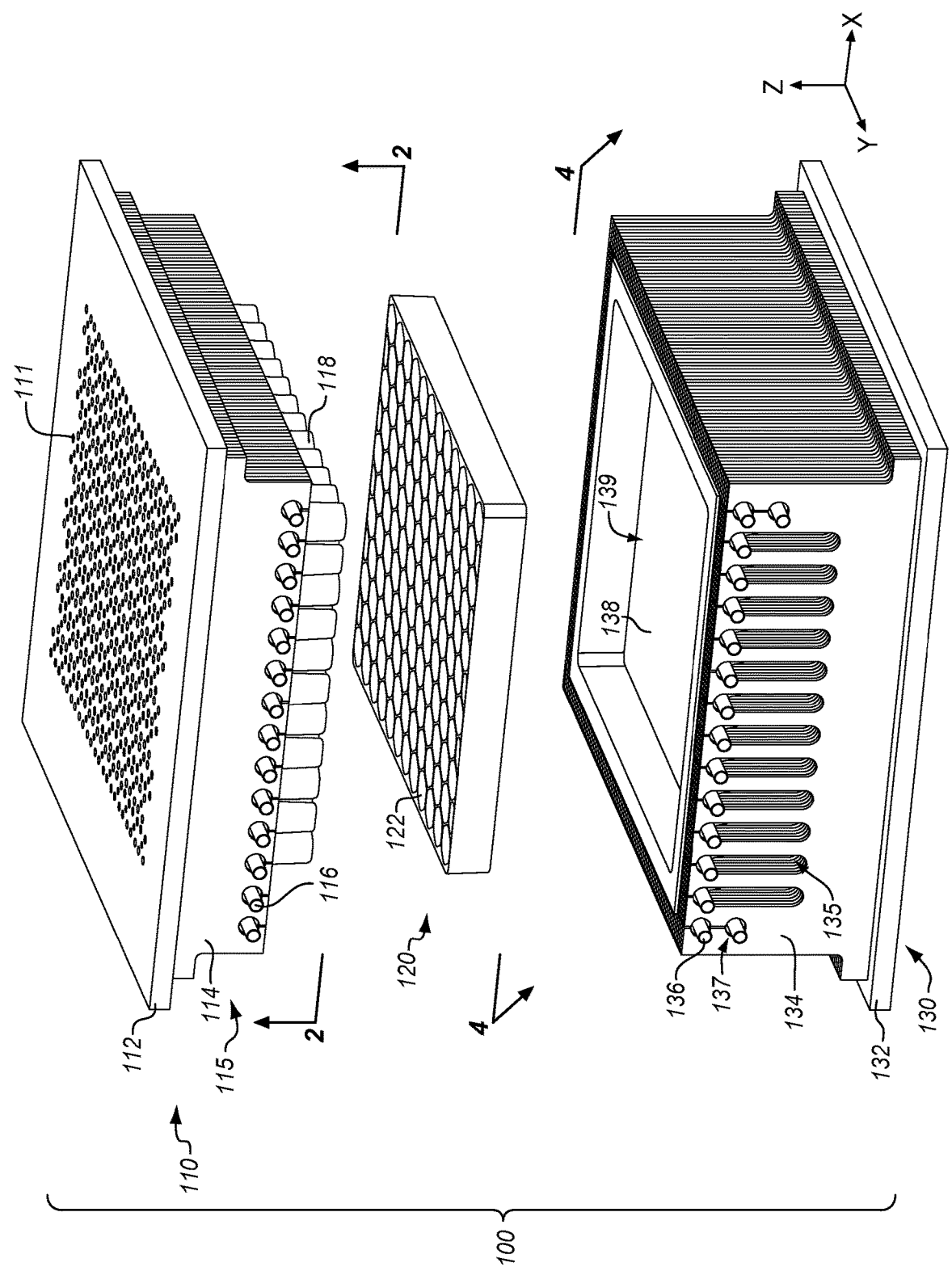
FIG. 1 is an exploded perspective view diagram of a molding system in an illustrative embodiment.

FIGS. 1-9 illustrate views of molding system 100 and various components thereof in an illustrative embodiment. For example, FIG. 1 is an exploded perspective view diagram of molding system 100 in an illustrative embodiment. In this embodiment, molding system 100 comprises upper tool 110 and lower tool 130. Upper tool 110 and lower tool 130 unite to shape a thermoplastic portion 122 of composite part 120.

Composite part 120 may comprise a Carbon Fiber Reinforced Polymer (CFRP) part that is initially laid-up in multiple layers that together form a laminate. Individual fibers within each layer of the laminate may be aligned parallel with each other, but different layers may exhibit different fiber orientations in order to increase the strength of the resulting composite part along different dimensions. The laminate may include a liquid resin. The resin solidifies at increased temperature, which hardens the laminate into a composite part (e.g., for use in an aircraft). For thermoset resins, the hardening is a one-way process referred to as curing, while for thermoplastic resins, the resin may return to liquid form if it is re-heated. In some embodiments, composite part 120 may include short chopped fibers (e.g., fibers of a few centimeters in length or less) that are randomly oriented within the part.

Upper tool 110 includes base 112, which defines multiple holes 111. Upper tool 110 also includes frame 114, which is attached to base 112, as well as first set 115 of induction coils 116 which penetrate through frame 114. Induction coils 116 heat one or more susceptors internal to upper tool 110, such as susceptor 210 of FIG. 2. The frequency of induction coils 116 may be selected to ensure efficient heating of corresponding susceptors. Induction coils 116 may be powered by a power supply (e.g., an electrical power supply 1460 of FIG. 14).

The susceptors described herein may comprise "smart" susceptors that have a Curie point corresponding with (e.g., within ten degrees Celsius (° C.) of) a desired molding temperature/processing temperature (e.g., two hundred ° C.). Smart susceptors are made from materials that heat asymptotically towards their Curie point, without exceeding their Curie point in the presence of fields generated by surrounding induction coils. This effect is caused by electrical conduction within the susceptors dropping off as the susceptor material demagnetizes. Examples of smart susceptor materials include ferromagnetic materials such as Kovar, and other alloys of iron, nickel, and cobalt. Susceptors described herein may also be made of the same ferromagnetic material if desired.

Mold 118 forms a lower surface of upper tool 110, and will touch thermoplastic portion 122 during the molding process. Mold 118 maybe formed from a magnetically permeable material such as non-magnetic stainless steel. In such a case, a thickness of components of mold 118 may be less than a skin depth at which induction coils 116 would cause induction within mold 118. Thus, the material does not generate heat in response to the electric field generated by induction coils 116. Mold 118 may be made from a material distinct from the susceptors described above, for example to reduce cost, ensure a longer tool life, etc. Mold 118 may be shaped into a contour as desired.

Lower tool 130 comprises base 132 and frame 134. Frame 134 defines multiple slots 135. Inserted into slots 135 are second set 137 of induction coils 136. Induction coils 136 facilitate the generation of heat at susceptor 138 to increase a temperature of thermoplastic portion 122 to a processing temperature (e.g., melting point, sticking point, tacking temperature, etc.). Susceptor 138 forms a receptacle 139. In embodiments wherein receptacle 139 holds loose chopped Poly Ether Ketone Ketone (PEKK) or other thermoplastic, receptacle 139 may be deep enough to hold a desired volume of thermoplastic for molding.

Figure 2:
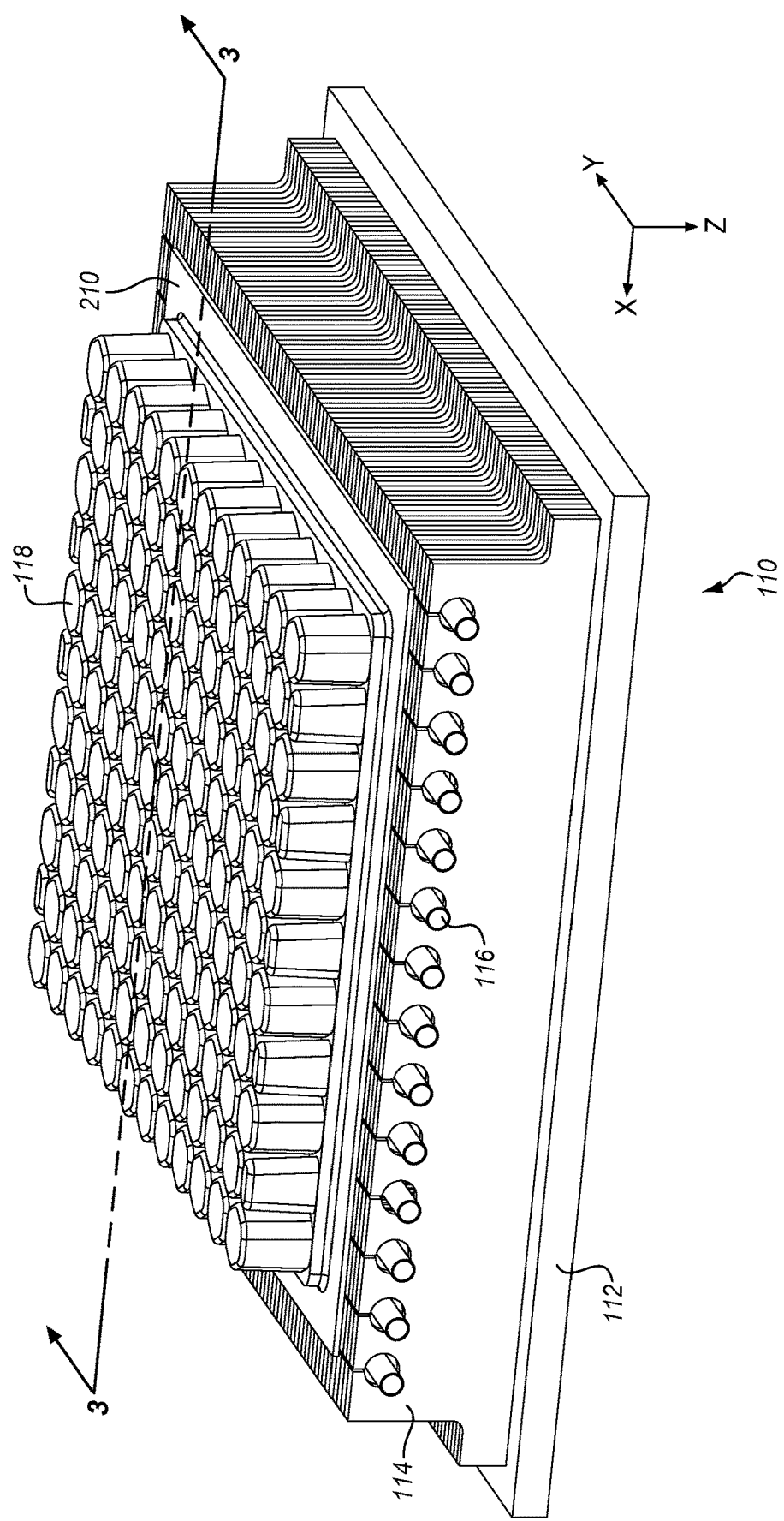
FIG. 2 is a perspective view of an upper tool of the molding system of FIG. 1 in an illustrative embodiment.

FIG. 2 is a perspective view of upper tool 110 of molding system 100 in an illustrative embodiment. FIG. 2 corresponds with view arrows 2 of FIG. 1, and upper tool 110 has been rotated with respect to the view shown in FIG. 1 so that upper tool 110 is upside-down. FIG. 2 illustrates susceptor 210, which abuts mold 118. Thus, as susceptor 210 is heated by induction coils 116, susceptor 210 engages in conductive heat transfer with mold 118.

Figure 3:
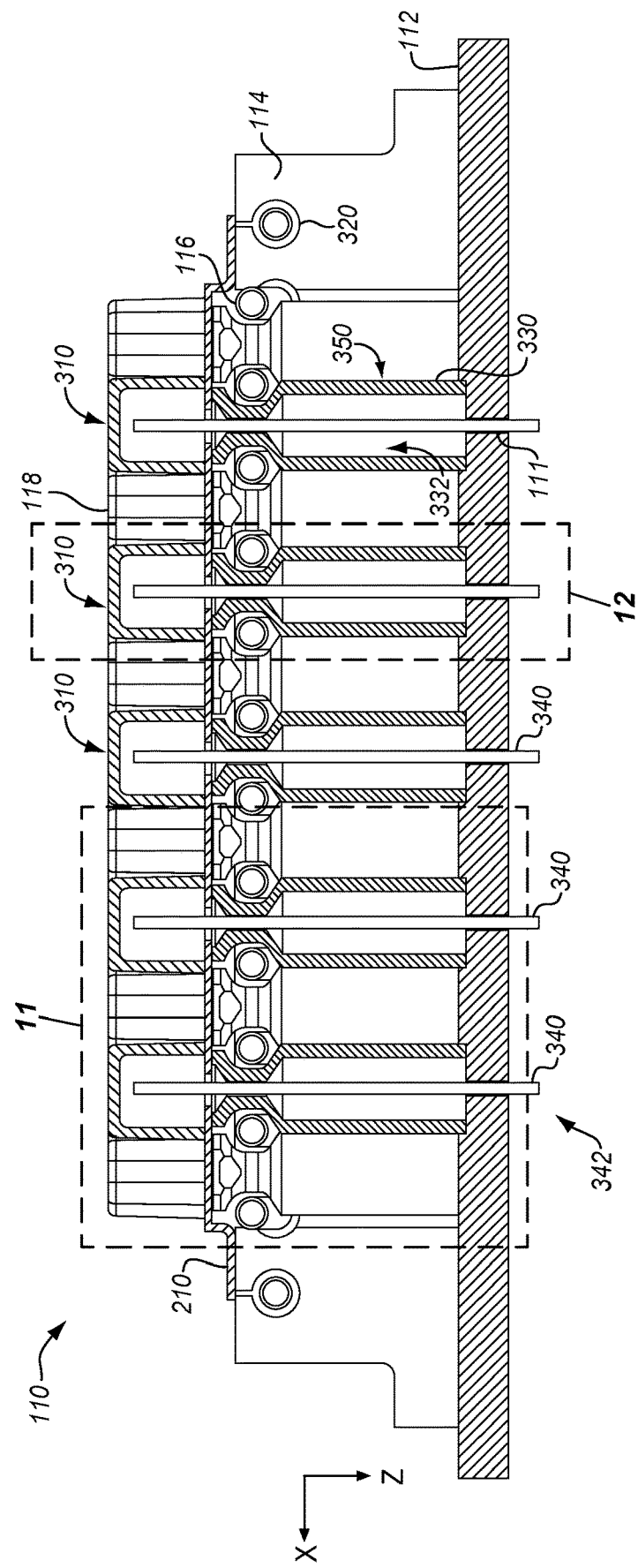
FIG. 3 is a cut-through view of an upper tool of the molding system of FIG. 1 in an illustrative embodiment.

FIG. 3 is a cut-through view of upper tool 110, and corresponds with view arrows 3 of FIG. 2. FIG. 3 illustrates that mold 118 comprises multiple tooling plugs 310 (e.g., individual pieces). Each tooling plug 310, in addition to contacting a susceptor 210, is physically coupled with a support 350. Each support 350 includes walls 330. Walls 330 define a chamber 332 which is coupled with hole 111 in base 112. Tubes 340 penetrate through holes 111 and chambers 332 into tooling plugs 310. Tubes 340 may apply a pressurized cooling fluid (e.g., a cold gas that is below the processing temperature, air, liquid nitrogen, etc.) to reduce the temperature of tooling plugs 310 after molding has completed. Thus, the set of tubes 340 is referred to herein as cooling system 342. FIG. 3 further illustrates slots 320 through which induction coils 116 traverse frame 114.

Figure 4:
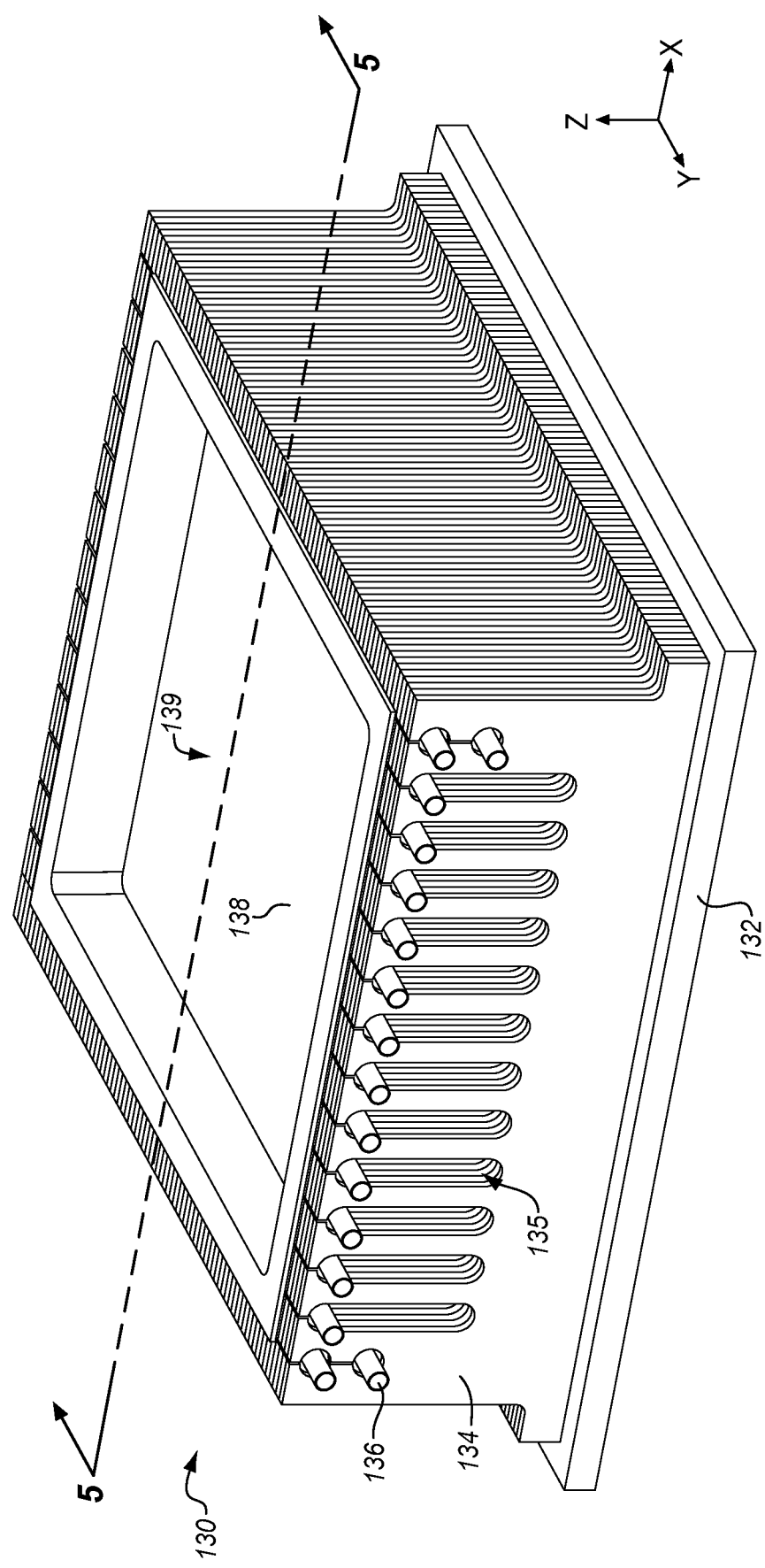
FIG. 4 is a perspective view of a lower tool of the molding system of FIG. 1 in an illustrative embodiment.
Figure 5:
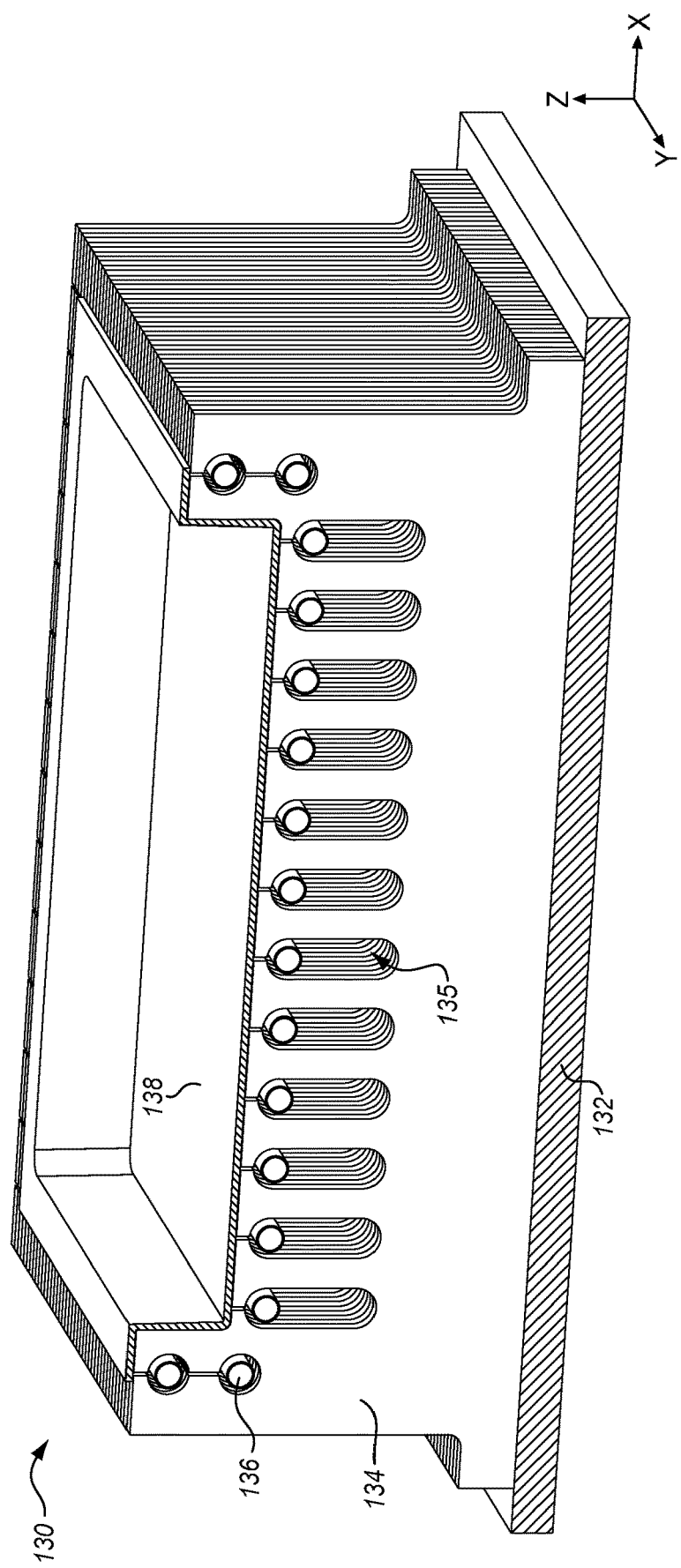
FIG. 5 is a cut-through view of a lower tool of the molding system of FIG. 1 in an illustrative embodiment.

FIG. 4 is a perspective view of lower tool 130 of molding system 100 in an illustrative embodiment, while FIG. 5 is a cut-through view of lower tool 130 indicated by view arrows 5 of FIG. 4. FIG. 4 illustrates a closer view of susceptor 138, including receptacle 139. FIG. 5 illustrates that a size of each slot 135 may vary within frame 134.

Figure 6:
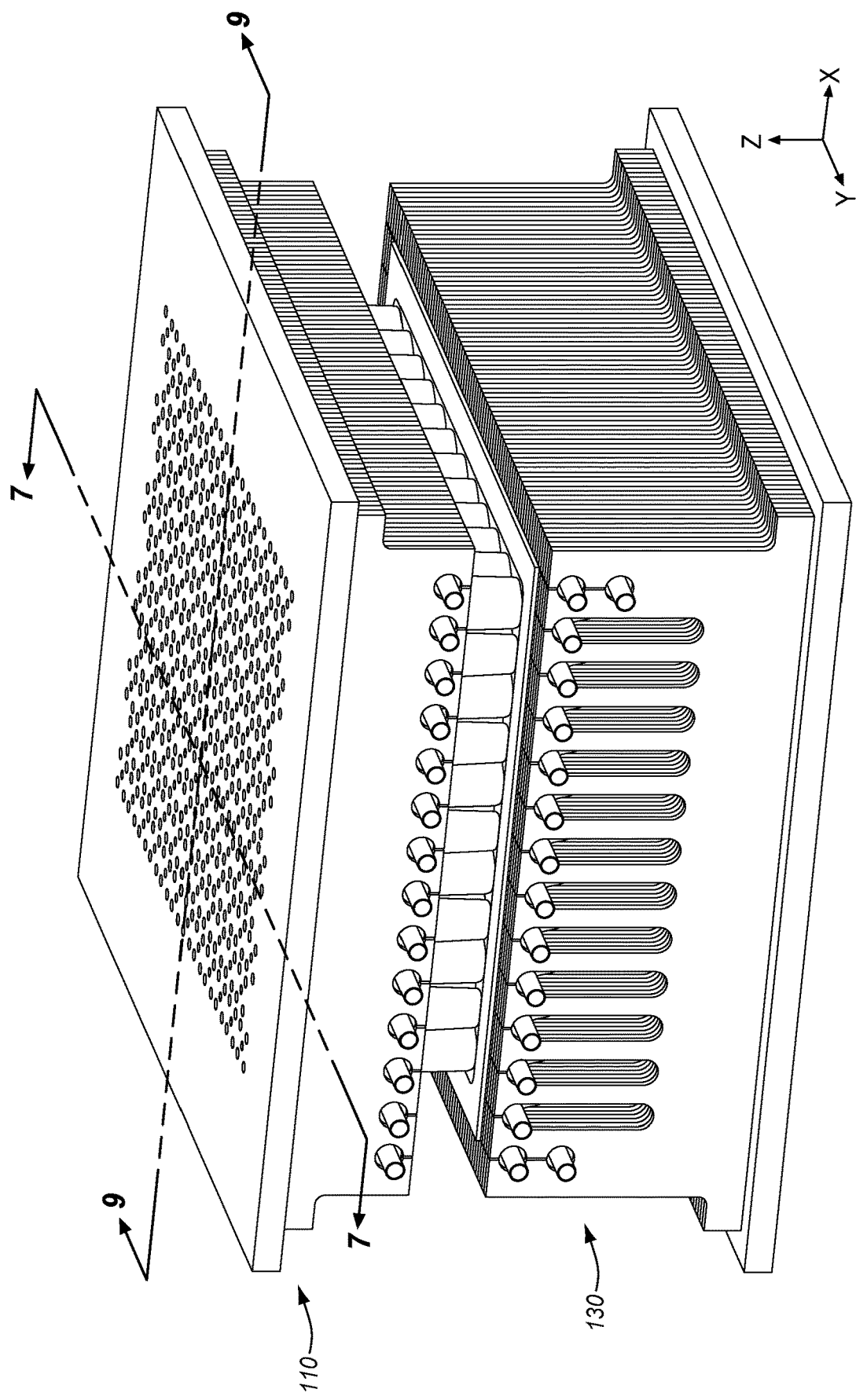
FIG. 6 is a perspective view of the molding system of FIG. 1 in an illustrative embodiment.

With a description provided for both upper tool 110 and lower tool 130, the molding process is illustrated in FIGS. 6-9. FIG. 6 is a perspective view of molding system 100 in an illustrative embodiment. In this view, composite part 120 has been inserted into a receptacle 139 defined by susceptor 138.

Figure 7:
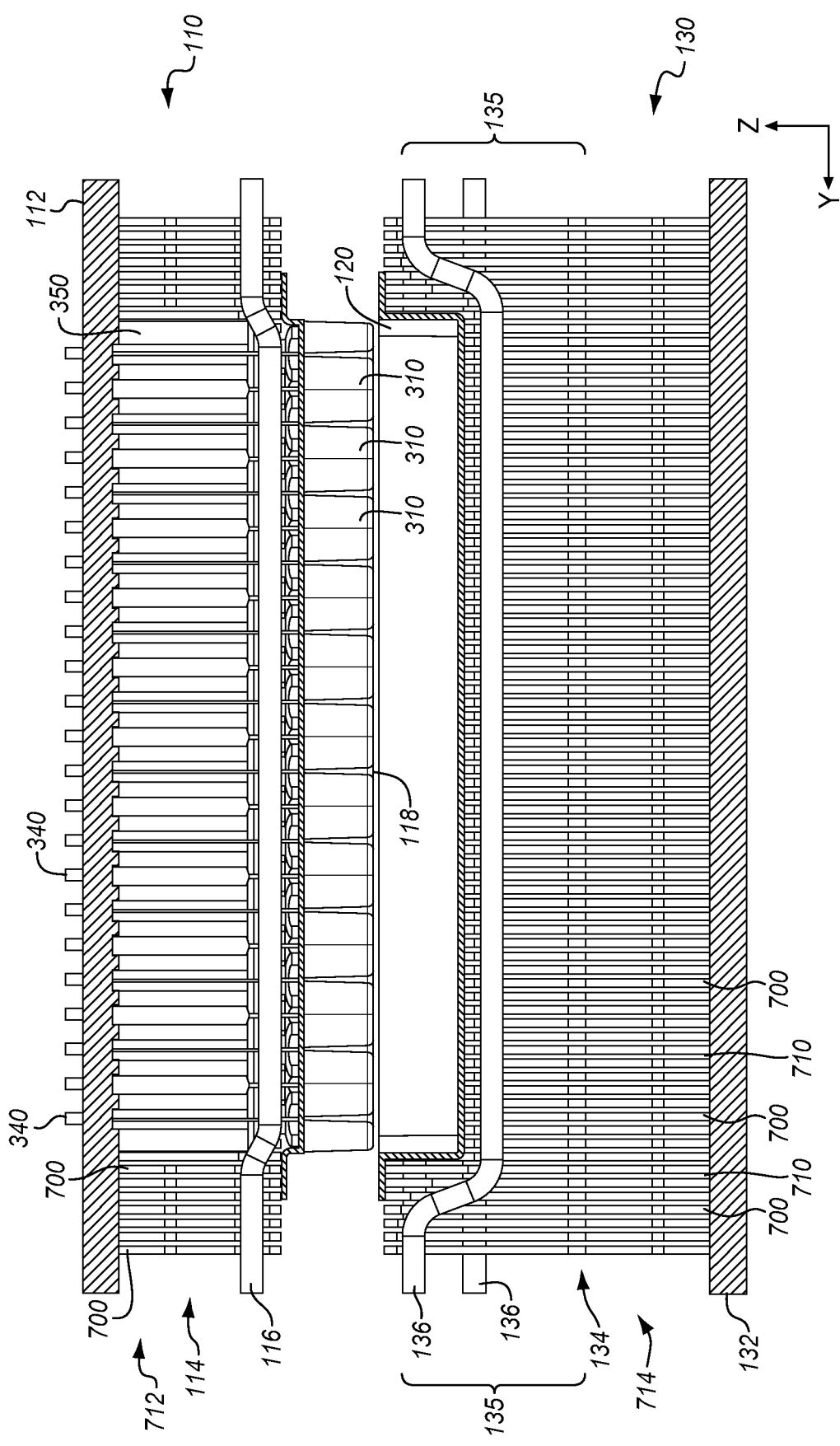
FIGS. 7-9 are cut-through views of the molding system of FIG. 1 in an illustrative embodiment.
Figure 8:
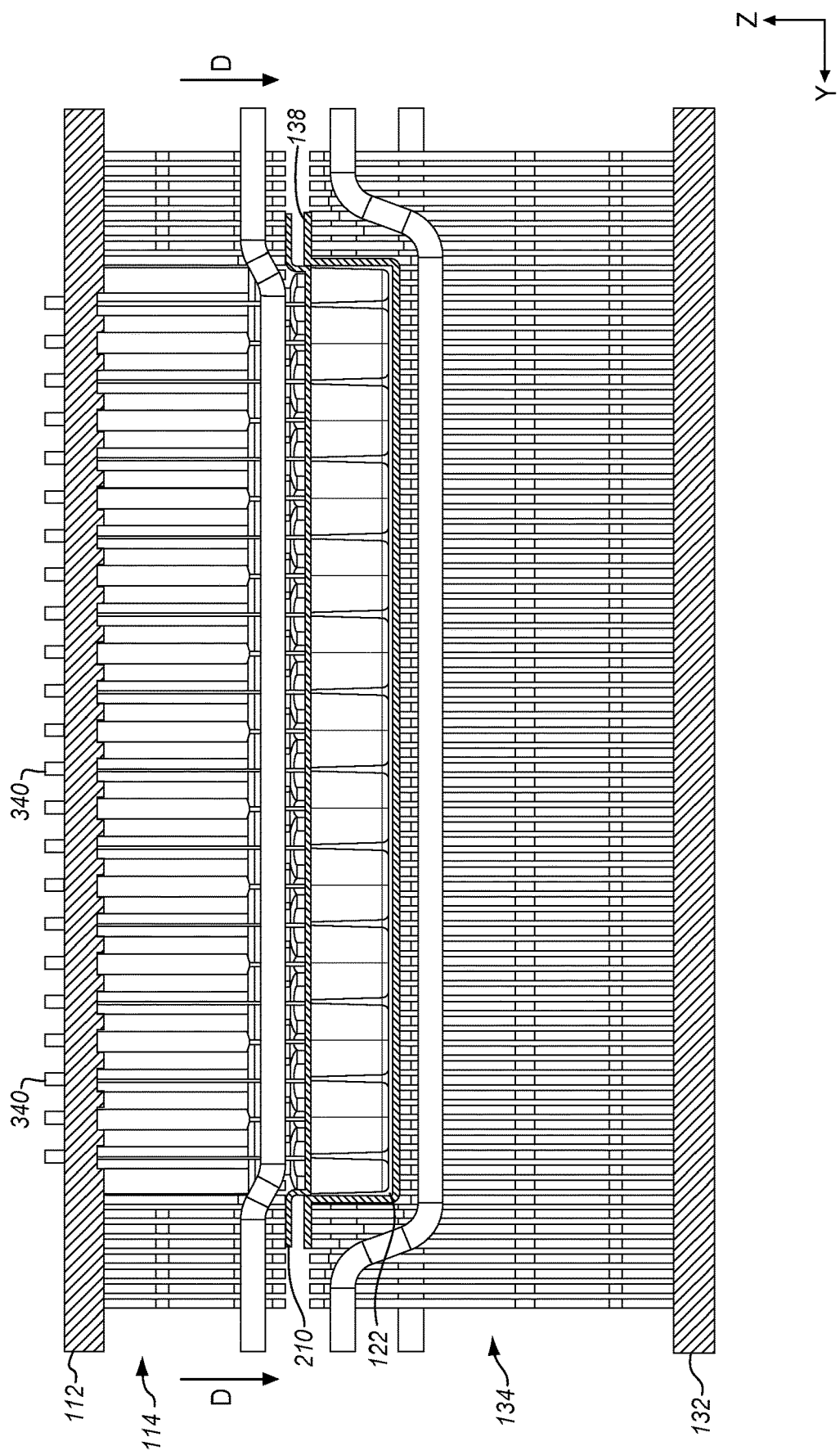
Figure 9:
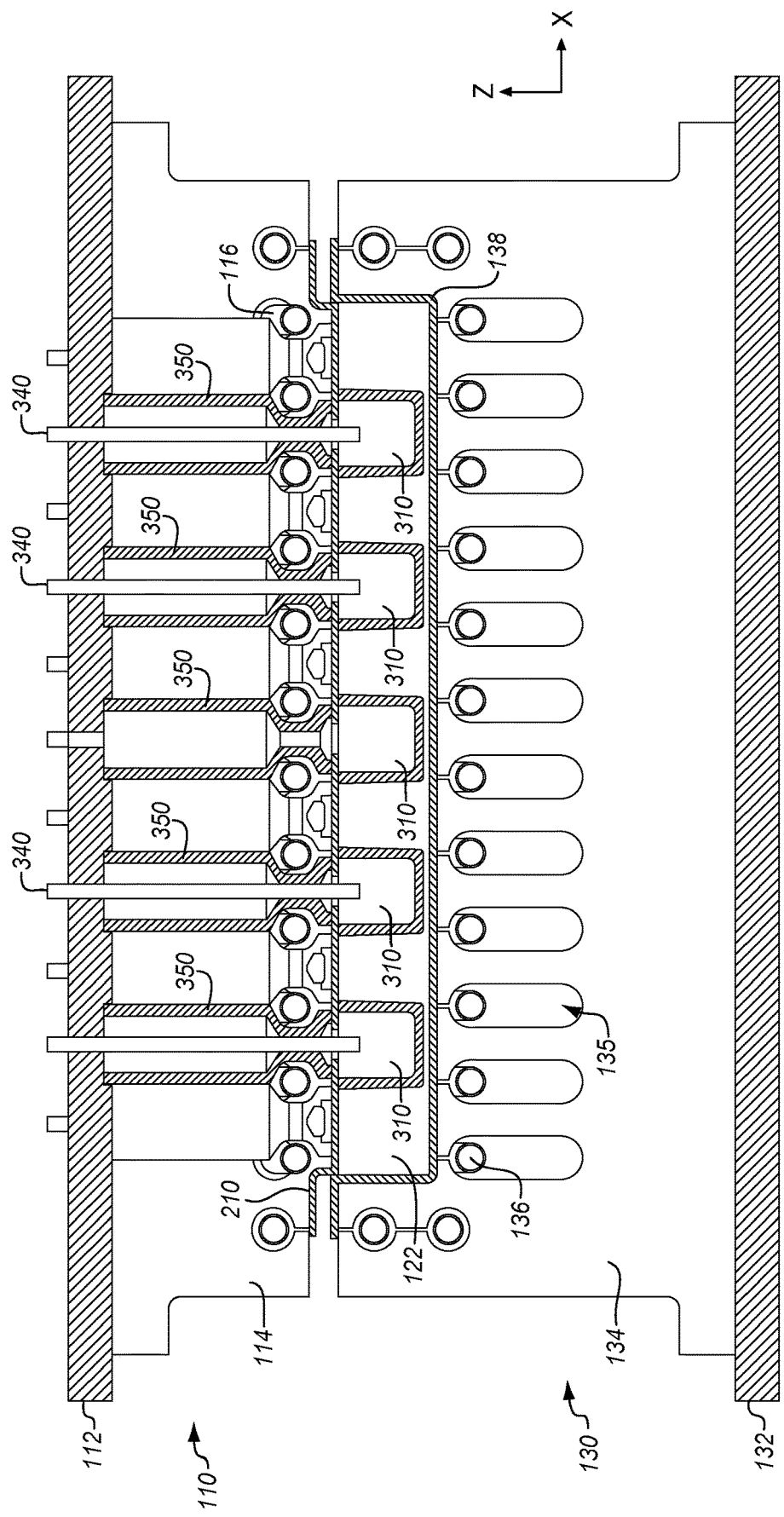

FIGS. 7-9 are cut-through views of molding system 100 engaging in molding of composite part 120 in an illustrative embodiment. FIG. 7 corresponds with view arrows 7 of FIG. 6. As shown in FIG. 7, mold 118 is disposed just above composite part 120. Mold 118 is heated by conductive heat transfer with susceptor 138, which is itself heated by induction coils 116. Meanwhile, susceptor 210 may be heated by induction coils 136. After mold 118 is heated to a specific temperature, such as the processing temperature for thermoplastic portion 122, mold 118 shapes thermoplastic portion 122 by moving downward and penetrating into thermoplastic portion 122.

FIG. 7 also illustrates that frame 114 is composed of a first set 712 of plates 700 of magnetically permeable material (e.g., non-magnetic steel), and that frame 134 is composed of a second set 714 of plates 700 of magnetically permeable material. Each plate 700 is separated from another plate 700 by a material 710, disposed between the plates 700, that structurally unites the plates 700 while preventing electrical conduction between the plates 700. Material 710 may be implemented for example in ceramic plates that are disposed between plates 700. As used herein, a "magnetically permeable" material is capable of enabling a magnetic field to penetrate through it, without attenuating the magnetic field substantially (e.g., by more than ten percent). Plates 700 are also each thinner than a skin depth (e.g., one quarter of an inch) at which their material (e.g., non-magnetic steel) would generate electrical induction current in response to magnetic fields from the induction coils. This is true for plates 700 in frame 114 and frame 134. The skin depth is based on a frequency of electrical power being supplied to induction coils that generate electromagnetic fields. Selecting plate thickness in this manner helps to reduce the overall thermal mass of both upper tool 110 and lower tool 130.

Frame 134 may also be constructed from nonmagnetic, but magnetically permeable components, which ensures that induction coils 116 and 136 do not generate inductive currents within frame 134 or frame 114 that would cause these frames to rapidly heat. At the same time, this ensures that electromagnetic fields generated by induction coils 116 and induction coils 136 are not unduly attenuated. FIG. 8 corresponds with the same view shown in FIG. 7, but illustrates alterations to composite part 120 while it is being molded by mold 118 traveling in direction D.

FIG. 9 also illustrates composite part 120 during the molding process, and corresponds with view arrows 9 of FIG. 6. FIG. 9 illustrates tubes 340, which may disperse a cooling fluid into tooling plugs 310 after a desired shape has been formed via induction molding. The cooling fluid reduces the temperature of tooling plugs 310. When tooling plugs 310 are cooled, they experience thermal contraction. This in turn enhances the ease with which tooling plugs 310 are removed from thermoplastic portion 122. Additionally, speeding up the cooling process via the use of tubes 340 reduces cycle time when fabricating a large number of parts.

With a description of the physical components of molding system 100 provided above, an explanation of the molding process follows to illustrate a method by which molding system 100 may be used. Assume, for this embodiment, that composite part 120 includes thermoplastic portion 122, and that upper tool 110 and lower tool 130 are presently separated and not being heated. Molding of thermoplastic portion 122 is desired.

Figure 10:
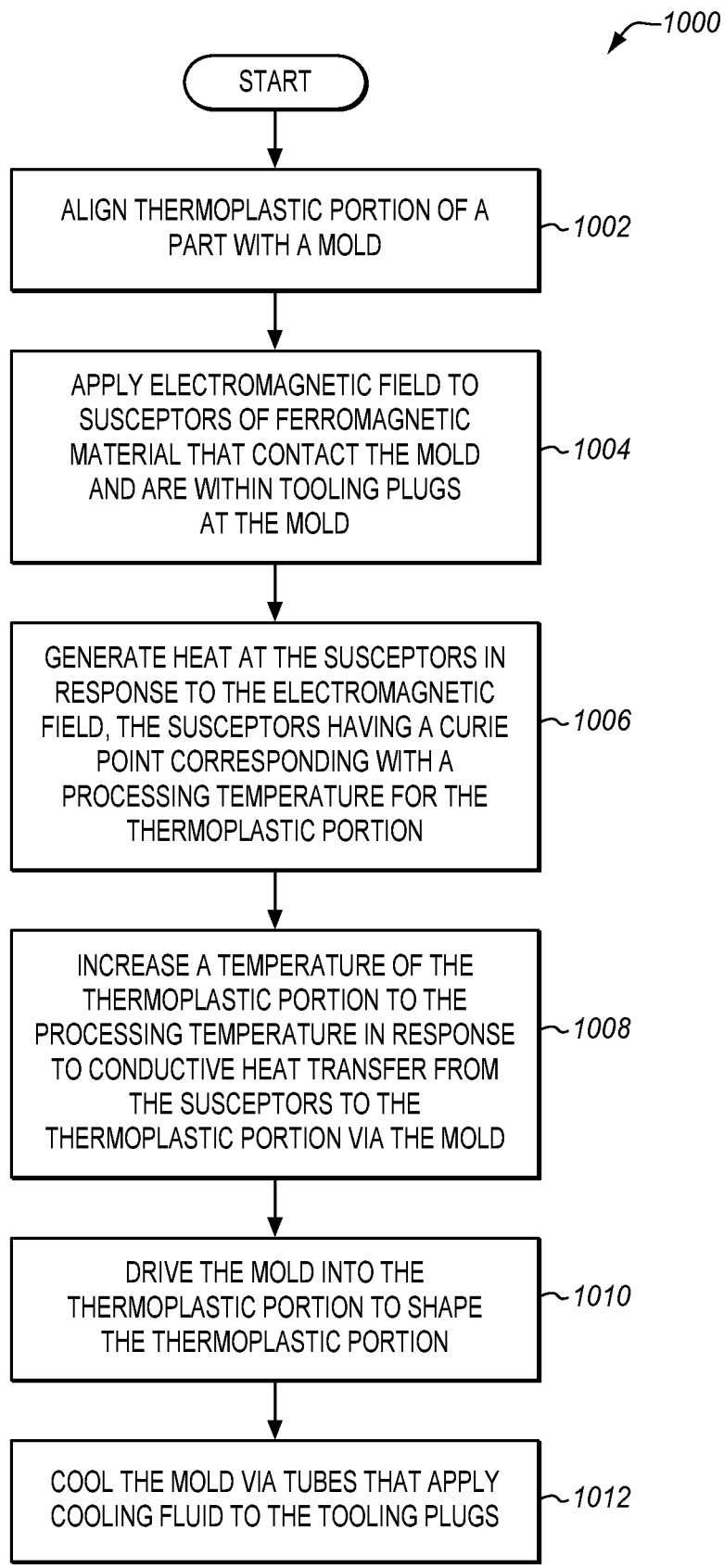
FIG. 10 is a flowchart illustrating a method for operating a molding system in an illustrative embodiment.

FIG. 10 is a flowchart illustrating a method for operating a molding system in an illustrative embodiment. The steps of method 1000 are described with reference to molding system 100 of FIG. 1, but those skilled in the art will appreciate that method 1000 may be performed in other systems. The steps of the flowcharts described herein are not all inclusive and may include other steps not shown. The steps described herein may also be performed in an alternative order.

Figure 11:
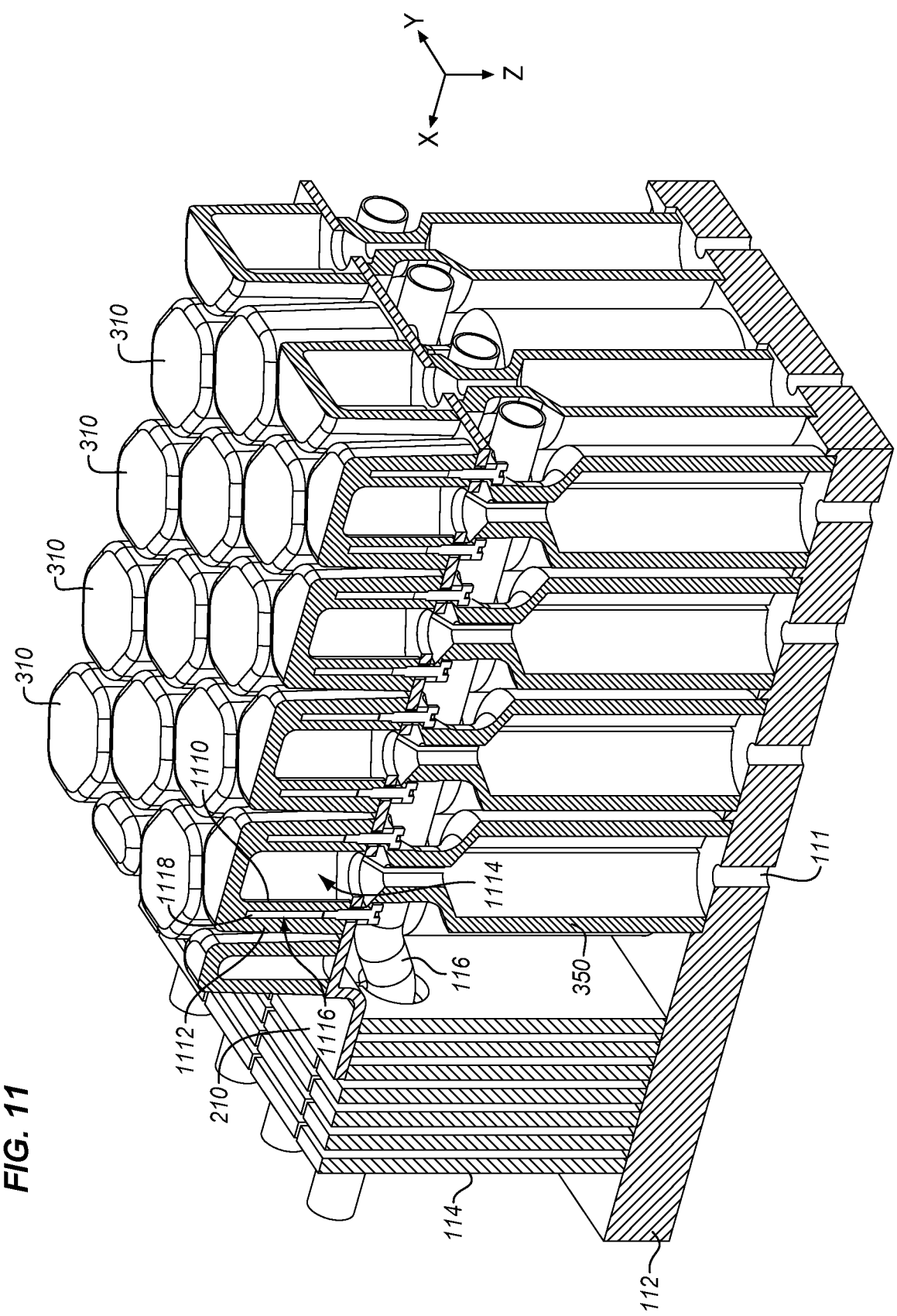
FIGS. 11-12 are zoomed in, cut-through views of regions of the molding system of FIG. 1 in an illustrative embodiment.

Thermoplastic portion 122 of composite part 120 is aligned with mold 118 (step 1002). This may comprise placing composite part 120 into receptacle 139 of susceptor 138. At this point in time, molding system 100 is in position to initiate molding. An electromagnetic field is applied to susceptor 210 of ferromagnetic material that contacts mold 118, as well as additional susceptors 1118 which are inserted into tooling plugs 310 (as illustrated in FIG. 11) (step 1004). This operation may be performed by activating induction coils 116 and/or induction coils 136. This generates heat at susceptors 210, 138, and additional susceptors 1118 in response to the electromagnetic field (step 1006). Susceptors 138, 210, and additional susceptors 1118 have a Curie point corresponding with (e.g., within ten degrees Celsius of) the processing temperature for thermoplastic portion 122. This means that when susceptors 138, 210, and additional susceptors 1118 are heated substantially towards the processing temperature for thermoplastic portion 122, those susceptors become nonmagnetic and stop heating inductively. This effectively causes the susceptors to achieve a steady-state temperature while being heated by induction coils 116 and 136.

As susceptors 210, 138, and additional susceptors 1118 heat, they increase a temperature of thermoplastic portion 122 to the processing temperature (e.g., two hundred ° C.) (step 1008). The increase in temperature is at least partly in response to conductive heat transfer from susceptor 210 to thermoplastic portion 122 via mold 118. Upon reaching the processing temperature, thermoplastic portion 122 is capable of being molded. Thus, mold 118 is driven into thermoplastic portion 122 (step 1010). After thermoplastic portion 122 has been shaped, mold 118 may be cooled via tubes 340, which apply a cooling fluid to tooling plugs 310, rapidly cooling tooling plugs 310 and facilitating withdrawal of mold 118 from composite part 120.

In summation, method 1000 may facilitate controlled heated molding of a thermoplastic while limiting waste heat. Method 1000 achieves this goal by: inductively heating at least one susceptor that contacts a mold, while preventing inductive heating of structural components that support the mold (owing to structural components of the tools being too thin for inductive heating). Method 1000 further engages in molding the thermoplastic by driving the mold into the thermoplastic, and may include cooling the mold by applying a cooling fluid directly to one or more internal chambers (e.g., chamber 332) of the mold.

Method 1000 provides a substantial advantage over prior systems, because it utilizes enhanced susceptors that are capable of performing "smart" heating instead of runaway thermal heating. This smart susceptor technology allows for precise thermal control at the critical processing temperature. Furthermore, method 1000 utilizes a molding system which includes parts that are carefully designed and shaped to avoid inductive heating from occurring in other components than the susceptors. By reducing waste heat in this manner, upper tool 110 and lower tool 130 may be rapidly heated and cooled, which increases the fabrication rate of these tools and thereby enhances production efficiency.

Figure 12:
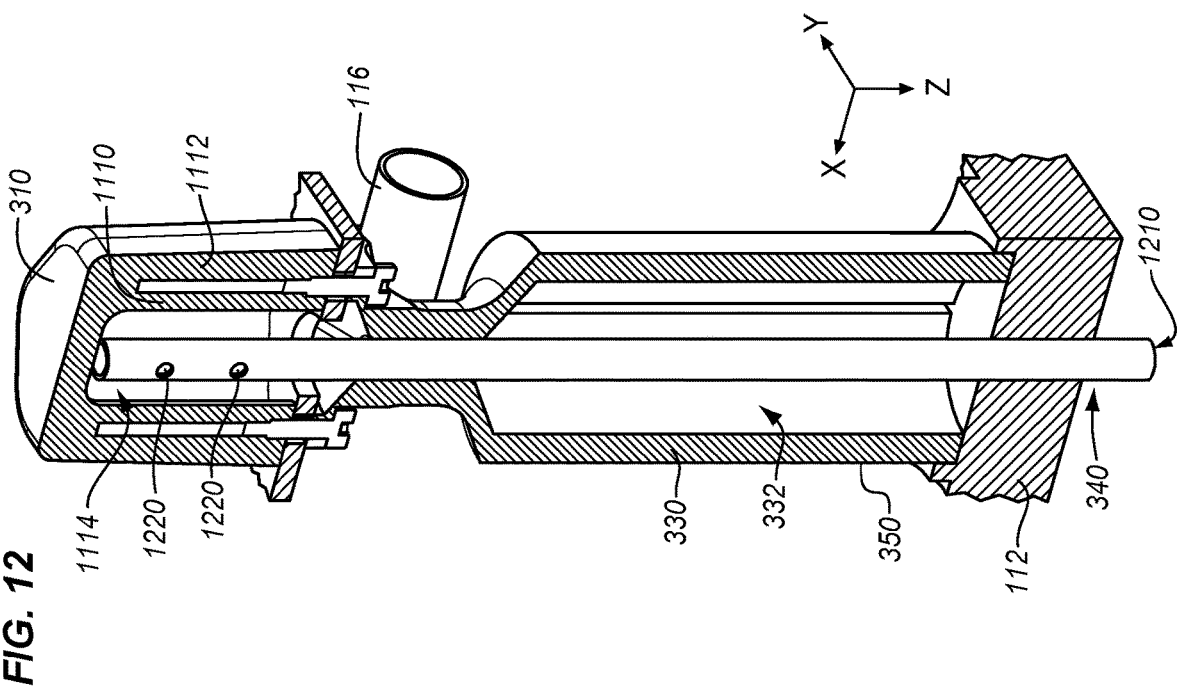

With a discussion of the components and operations of molding system 100 provided above, FIGS. 11-12 are zoomed in, cut-through views of regions of the molding system of FIG. 1 in an illustrative embodiment. These views specifically illustrate components of molding system 100. Specifically, FIG. 11 corresponds with region 11 of FIG. 3, while FIG. 12 corresponds with region 12 of FIG. 3.

FIG. 11 illustrates that each tooling plug 310 includes an inner cavity 1114 defined by inner walls 1110. Inner walls 1110 and outer walls 1112 also define outer cavity 1116, into which additional susceptor 1118 is disposed. The use of additional susceptors 1118 within outer cavities 1116 of tooling plugs 310 may enhance the degree of heating provided to tooling plugs 310. While FIG. 11 illustrates additional locations for susceptors which are inserted within mold 118, FIG. 12 illustrates a configuration for a tube 340 that cools a tooling plug 310. FIG. 12 illustrates that each tube 340 may include a hollow passage 1210 through which a pressurized cooling fluid travels, exiting through ports 1220 into inner cavities 1114 of each tooling plug 310. Hence, tubes 340, which are inserted into inner cavities 1114, are in fluid communication with inner cavities 1114.

Figure 13:
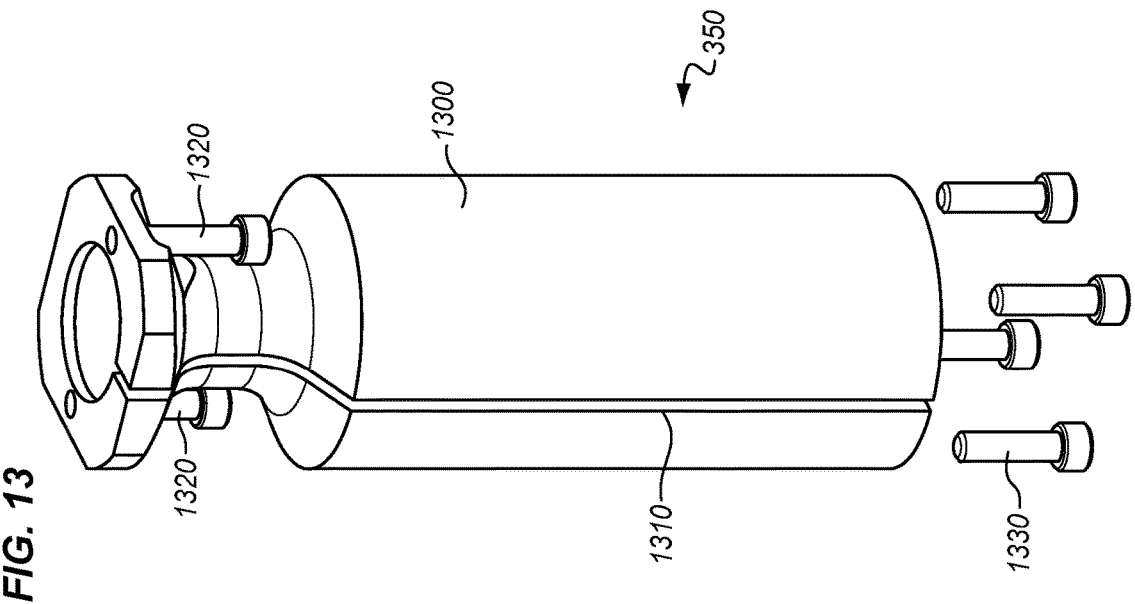
FIG. 13 is a perspective view of a support for tooling plugs within a molding system in an illustrative embodiment.

FIG. 13 is a perspective view of a support 350 for tooling plugs within a molding system in an illustrative embodiment. In this embodiment, support 350 includes a body 1300 which is a hollow cylinder with a slit 1310. Slit 1310 ensures that electrical current pathways do not exist within support 350 which would otherwise result in inductive heating. Furthermore, support 350 is attached to mold 118, and is made from a magnetically permeable material (e.g., non-magnetic stainless steel) that does not increase in temperature by more than a threshold amount (e.g., ten degrees Celsius) in response to the electromagnetic field generated by induction coils within molding system 100. Fasteners 1320 attach support 350 to a tooling plug 310, while fasteners 1330 attach support 350 to base 112.

EXAMPLES

In the following examples, additional processes, systems, and methods are described in the context of an inductive molding system.

Figure 14:
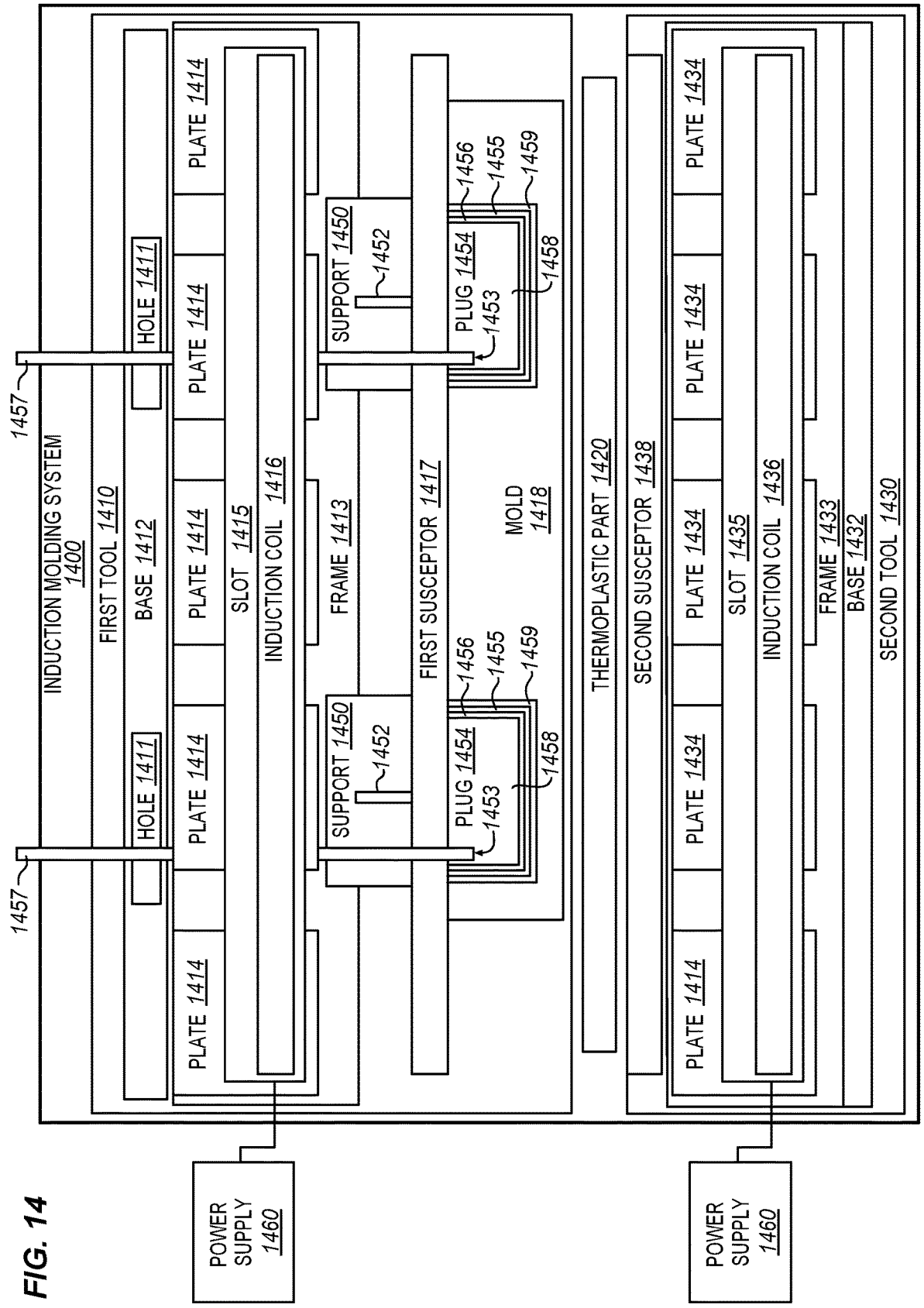
FIG. 14 is a block diagram illustrating a molding system in an illustrative embodiment.

FIG. 14 is a block diagram illustrating a molding system 1400 in an illustrative embodiment. According to FIG. 14, molding system 1400 includes first tool 1410, and second tool 1430. Molding system 1400 molds the shape of thermoplastic part 1420. First tool 1410 includes base 1412, which includes multiple holes 1411. Frame 1413 is also illustrated, which includes multiple plates 1414. Slots 1415 within frame 1413 hold induction coils 1416, which are powered by an electrical power supply 1460 and heat susceptors at first tool 1410.

First tool 1410 further includes supports 1450, which include slits 1452. First susceptor 1417 is attached to supports 1450, and tubes 1457 continue through first susceptor 1417 and into tooling plugs 1454. Cooling fluid exits ports 1453 of tubes 1457. Tooling plugs 1454 include outer wall 1459, outer (wall) cavity 1455, inner wall 1456, and inner (central) cavity 1458.

Second tool 1430 includes frame 1433, comprising plates 1434. Slots 1435 continue through plates 1434, and one or more induction coils 1436 are disposed within slots 1435. A second susceptor 1438 is in contact with thermoplastic part 1420 during molding.

Figure 15:
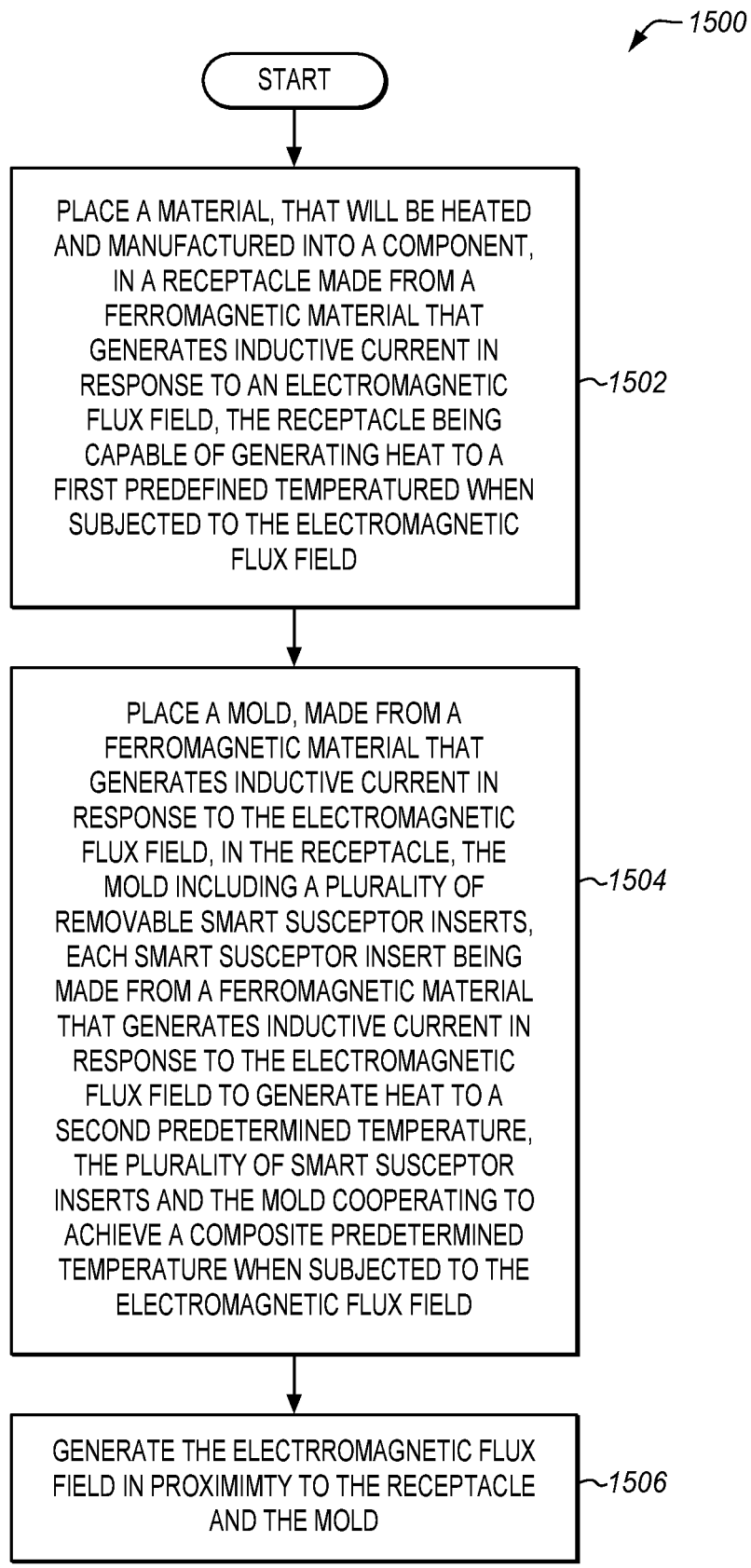
FIG. 15 is a further flowchart illustrating a method for operating a molding system in an illustrative embodiment.

FIG. 15 is a further flowchart illustrating a method 1500 for operating a molding system 100 in an illustrative embodiment. According to FIG. 15, method 1500 is utilized for manufacturing a component (e.g., composite part 120) by heating material (e.g., thermoplastic) which forms the component to a predetermined temperature. Method 1500 includes placing a material, that will be heated and manufactured into the component, in a receptacle 139 made from a ferromagnetic material that generates inductive current in response to an electromagnetic flux field (in step 1502). The receptacle 139 is capable of generating heat to a first predetermined temperature (e.g., one hundred and eighty ° C.) when subjected to the electromagnetic flux field. Method 1500 further comprises placing a mold 118, made from a ferromagnetic material that generates inductive current in response to the electromagnetic flux field, in the receptacle 139 (step 1504). The mold 118 includes a plurality of removable smart susceptor inserts (e.g., additional susceptors 1118), each smart susceptor insert being made from a ferromagnetic material that generates inductive current in response to the electromagnetic flux field to generate heat to a second predetermined temperature (e.g., two hundred and five ° C.). The plurality of smart susceptor inserts and the mold cooperate to achieve a composite predetermined temperature (e.g., two hundred ° C.) when subjected to the electromagnetic flux field. Method 1500 further comprises generating the electromagnetic flux field in proximity to the receptacle and the mold (step 1506).

In further embodiments, method 1500 may comprise preventing electrical conduction between plates that contact the mold 118, generating a first electromagnetic field in a first set of induction coils at a first tool disposed within slots in a first frame, and generating heat in response to the first electromagnetic field to a Curie point within ten degrees Celsius of a processing temperature for a thermoplastic portion of a part.

Figure 16:
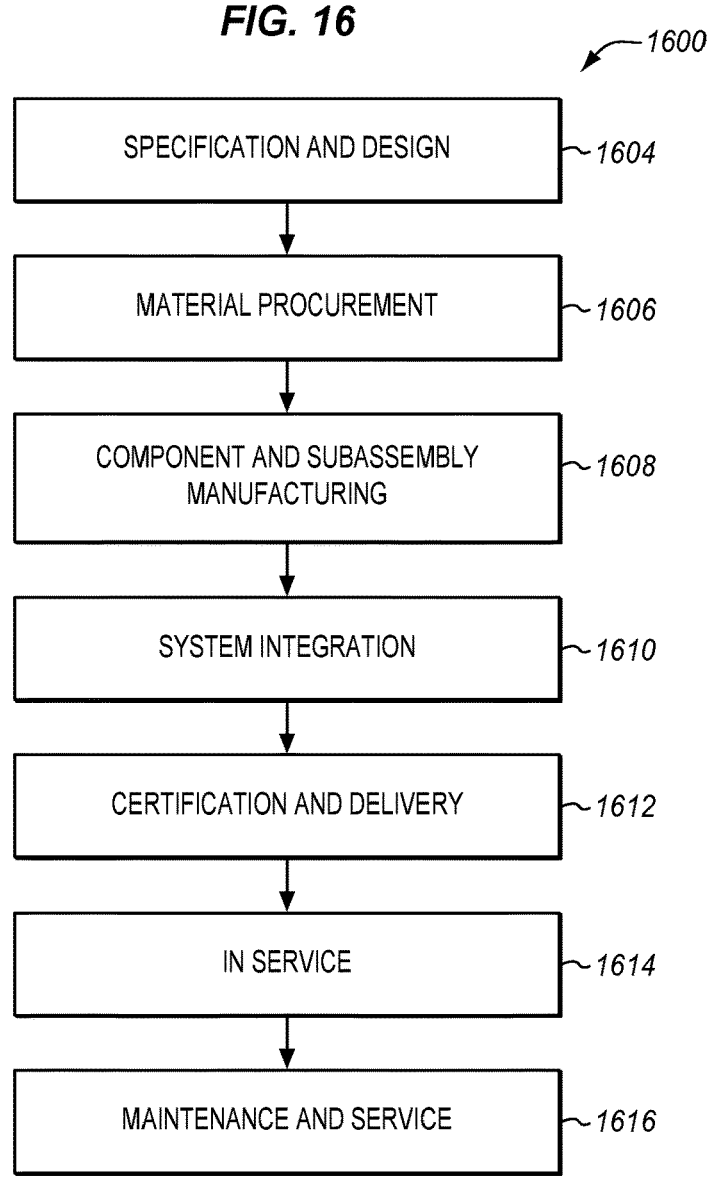
FIG. 16 is a flow diagram of aircraft production and service methodology in an illustrative embodiment.
Figure 17:
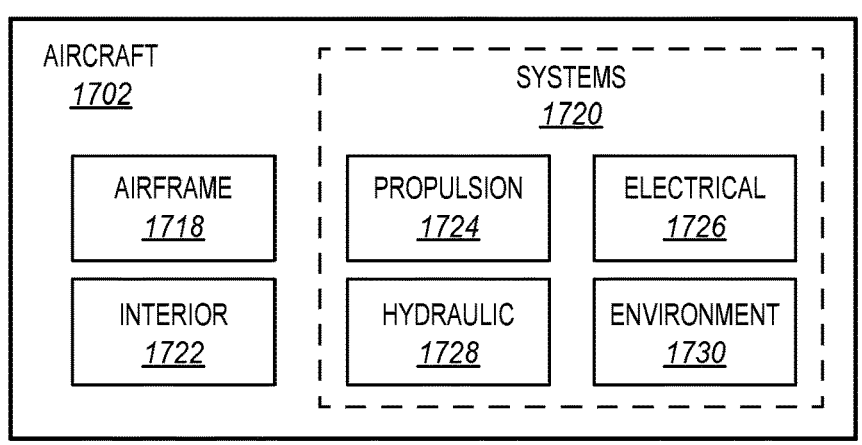
FIG. 17 is a block diagram of an aircraft in an illustrative embodiment.

Referring more particularly to the drawings, embodiments of the disclosure may be described in the context of an aircraft manufacturing and service method 1600 as shown in FIG. 16 and an aircraft 1602 as shown in FIG. 17. During pre-production, illustrative method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine maintenance and service 1616 (which may also include modification, reconfiguration, refurbishment, and so on). Apparatus and methods embodied herein may be employed during any one or more suitable stages of the production and service method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion 1624, electrical 1626, hydraulic 1628, environmental 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by illustrative method 1600 may include an airframe 1618 with a plurality of systems 1620 and an interior 1622. Examples of high-level systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1600. For example, components or subassemblies corresponding to production stage 1608 may be fabricated or manufactured in a manner similar to components or subassemblies produced while the aircraft 1602 is in service. Also, one or more apparatus embodiments, method embodiments, or a combination thereof may be utilized during the production stages 1608 and 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation, to maintenance and service 1616. For example, the techniques and systems described herein may be used for steps 1606, 1608, 1610, 1614, and/or 1616, and/or may be used for airframe 1618 and/or interior 1622. These techniques and systems may even be utilized for systems 1620, including for example propulsion 1624, electrical 1626, hydraulic 1628, and/or environmental 1630.

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the composite part 120 may be discarded and replaced with a newly manufactured part. Inventive components and methods described herein may be utilized throughout component and subassembly manufacturing 1608 in order to mold new parts.

Any of the various control elements (e.g., electrical or electronic components) shown in the figures or described herein may be implemented as hardware, a processor implementing software, a processor implementing firmware, or some combination of these. For example, an element that controls power to induction coils, or that actuates the tools described above, may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
    a first tool comprising:
        a first frame comprising:
            a first set of plates of magnetically permeable material that are parallel with each other and face each other; and
            a material, disposed between plates of the first set, that prevents electrical conduction between the plates;
        a first set of induction coils that are disposed within slots in the first frame and that generate a first electromagnetic field;
        a mold that forms a lower surface of the first tool; and
        a first susceptor interposed between the mold and the first frame, wherein the first susceptor is made of a ferromagnetic material that generates heat in response to the first electromagnetic field, and that has a Curie point within ten degrees Celsius of a processing temperature for a thermoplastic portion of a part;
    wherein the mold includes a plurality of tooling plugs that project from the lower surface of the first tool, and contact the first susceptor to receive heat via conductive heat transfer from the first susceptor,
    wherein each plate of the first set is thinner than a skin depth at which the first electromagnetic field would generate an electrical induction current in the plates of the first set;
    wherein a thickness of walls of the tooling plugs is less than a skin depth at which the first electromagnetic field would generate an electrical induction current in the tooling plugs.

2. The apparatus of claim 1 further comprising:
    a second tool comprising:
        a second frame comprising:
            a second set of plates of magnetically permeable material that are parallel with each other and face each other; and
            a material, disposed between plates of the second set, that prevent electrical conduction between the plates;
        a second set of induction coils that are disposed within slots in the second frame and that generate a second electromagnetic field; and a second susceptor of ferromagnetic material that generates heat in response to the second electromagnetic field, wherein the second susceptor is recessed within the second frame and defines a receptacle that is dimensioned to receive the mold, wherein each plate of the second set is thinner than a skin depth at which the second electromagnetic field would generate an electrical induction current in the plates of the second set.

3. The apparatus of claim 2 wherein:
the first susceptor and the second susceptor each comprise an alloy of iron, nickel, and cobalt.

4. The apparatus of claim 1 further comprising:
additional susceptors that are inserted into the mold, and that are made from a ferromagnetic material that generates heat in response to the first electromagnetic field.

5. The apparatus of claim 4 wherein:
the walls of each of the tooling plugs include inner walls that do not contact the part, and outer walls that contact the part, and
at least one of the additional susceptors is inserted in an outer cavity between the inner walls and the outer walls.

6. The apparatus of claim 1 wherein:
the magnetically permeable material forming the first set of plates is non-magnetic stainless steel.

7. The apparatus of claim 1 wherein:
the mold is made from a ferromagnetic material that is chemically distinct from the ferromagnetic material of the first susceptor.

8. The apparatus of claim 1 wherein the first tool further comprises:
a base attached to the first frame; and
a plurality of supports interposed between the base and a corresponding one of the tooling plugs.

9. The apparatus of claim 8 wherein:
the supports are made from a magnetically permeable material.

10. The apparatus of claim 9 wherein:
the supports are made from non-magnetic stainless steel.

11. The apparatus of claim 9 wherein:
the supports are thinner than a skin depth at which the first electromagnetic field would generate an electrical induction current within the supports.

12. The apparatus of claim 9 wherein:
each of the supports comprises a hollow cylinder that includes a slit extending along a length of the hollow cylinder.

13. The apparatus of claim 1 wherein
the walls of the tooling plugs include inner walls that define an inner cavity for each of the tooling plugs.

14. The apparatus of claim 13 further comprising:
a cooling system in fluid communication with the inner cavity of each of the tooling plugs, and that applies a fluid to the inner cavity to cool the tooling plugs below a processing temperature.

15. The apparatus of claim 14 wherein:
the cooling system comprises a tube inserted into the inner cavity of each of the tooling plugs.

16. The apparatus of claim 15 wherein:
the tube comprises a port that enables fluid to travel from the tube to the inner cavity.

17. The apparatus of claim 1 wherein:
the magnetically permeable material forming the mold is non-magnetic stainless steel.

18. A molding system, comprising:
a first tool and a second tool that unite to shape a part;
the first tool comprises:
a first base;
a first frame attached to the first base;
a first set of induction coils disposed through the first frame that generate a first electromagnetic field;
a first susceptor disposed along a side of the first frame opposite the first base; and
a plurality of tooling plugs that contact the first susceptor, and that project from the first susceptor to form a surface of the first tool that faces the second tool to shape the part;
wherein a thickness of walls of the tooling plugs is less than a skin depth at which the first electromagnetic field would generate an electrical induction current in the tooling plugs.

19. The molding system of claim 18 wherein:
the second tool comprises:
a second base;
a second frame attached to the second base;
a second set of induction coils disposed through the second frame that generate a second electromagnetic field; and
a second susceptor disposed along a side of the second frame opposite the second base;
wherein the second susceptor defines a receptacle that faces the tooling plugs of the first tool.

20. The molding system of claim 18 wherein:
the walls of the tooling plugs include inner walls that define an inner cavity for each of the tooling plugs.

21. The molding system of claim 20 further comprising:
a cooling system that applies a cooling fluid to the inner cavity of each of the tooling plugs.

22. The molding system of claim 21 wherein:
the cooling system includes a tube in fluid communication with the inner cavity of each of the tooling plugs; and
the tube includes a hollow passage through which the cooling fluid travels, and ports disposed within the inner cavity where the cooling fluid exits the hollow passage into the inner cavity.

23. The molding system of claim 20 wherein:
the walls of the tooling plugs further include outer walls; and
an outer cavity is interposed between the inner walls and the outer walls.

24. The molding system of claim 23 wherein the first tool further comprises:
an additional susceptor disposed in the outer cavity.

25. The molding system of claim 18 wherein the first tool further comprises:
a plurality of supports disposed between the first base and the first susceptor;
wherein one of the supports is fastened to a corresponding one of the tooling plugs.

26. The molding system of claim 25 wherein each of the supports comprises:
a hollow cylinder having a slit extending along a length of the hollow cylinder.

27. The molding system of claim 25 wherein:
the supports are made from a magnetically permeable material.

28. The molding system of claim 18 wherein:
the part comprises a composite part with thermoplastic; and
a Curie point of the first susceptor corresponds with a molding temperature of the thermoplastic.

29. The molding system of claim 18 wherein:
the part comprises a part for an aircraft.

30. A molding system, comprising:
a first tool and a second tool that unite to shape a composite part;
the first tool comprises:
- a first frame comprising a first set of plates separated by non-conductive material;
- a first set of induction coils disposed through the first frame that generate a first electromagnetic field;
- a first susceptor disposed along a side of the first frame; and
- a plurality of tooling plugs that contact the first susceptor, and that project from the first susceptor to form a surface of the first tool that faces the second tool to shape the composite part;

wherein walls of the tooling plugs have a thickness less than a skin depth at which the first electromagnetic field would generate an electrical induction current in the tooling plugs.

31. The molding system of claim 30 wherein:
the second tool comprises:
- a second frame comprising a second set of plates separated by non-conductive material;
- a second set of induction coils disposed through the second frame that generate a second electromagnetic field; and
- a second susceptor disposed along a side of the second frame;

wherein the second susceptor defines a receptacle that faces the tooling plugs of the first tool.

32. The molding system of claim 30 wherein:
the walls of the tooling plugs include inner walls that define an inner cavity for each of the tooling plugs.

33. The molding system of claim 32 further comprising:
a cooling system that applies a cooling fluid to the inner cavity of each of the tooling plugs.

34. The molding system of claim 33 wherein:
the cooling system includes a tube in fluid communication with the inner cavity of each of the tooling plugs; and
the tube includes a hollow passage through which the cooling fluid travels, and ports disposed within the inner cavity where the cooling fluid exits the hollow passage into the inner cavity.

35. The molding system of claim 32 wherein:
the walls of the tooling plugs further include outer walls; and
an outer cavity is interposed between the inner walls and the outer walls.

36. The molding system of claim 35 wherein the first tool further comprises:
an additional susceptor disposed in the outer cavity.

37. The molding system of claim 30 wherein the first tool further comprises:
a plurality of supports disposed between a base of the first tool and the first susceptor;
wherein one of the supports is fastened to a corresponding one of the tooling plugs.

38. The molding system of claim 37 wherein each of the supports comprises:
a hollow cylinder having a slit extending along a length of the hollow cylinder.

39. The molding system of claim 37 wherein:
the supports are made from a magnetically permeable material.

40. The molding system of claim 30 wherein:
the composite part includes a thermoplastic; and
a Curie point of the first susceptor corresponds with a molding temperature of the thermoplastic.

41. The molding system of claim 30 wherein:
the composite part comprises a part for an aircraft.

* * * * *